(12) United States Patent
Chiba et al.

(10) Patent No.: US 11,858,136 B2
(45) Date of Patent: Jan. 2, 2024

(54) PARALLEL LINK MECHANISM

(71) Applicant: NSK LTD., Tokyo (JP)

(72) Inventors: Haruaki Chiba, Kanagawa (JP);
Seiichi Teshigawara, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/027,296

(22) PCT Filed: Jun. 7, 2022

(86) PCT No.: PCT/JP2022/022874
§ 371 (c)(1),
(2) Date: Mar. 20, 2023

(87) PCT Pub. No.: WO2023/047715
PCT Pub. Date: Mar. 30, 2023

(65) Prior Publication Data
US 2023/0256592 A1 Aug. 17, 2023

(30) Foreign Application Priority Data

Sep. 21, 2021 (JP) ................................. 2021-153643

(51) Int. Cl.
*B25J 9/10* (2006.01)
*B25J 9/00* (2006.01)
(52) U.S. Cl.
CPC ........... *B25J 9/1065* (2013.01); *B25J 9/0048* (2013.01)
(58) Field of Classification Search
CPC ....... B25J 9/1065; B25J 9/0048; F16H 21/02; F16H 21/48
See application file for complete search history.

(56) References Cited

U.S. PATENT DOCUMENTS 9,851,045 B2 * 12/2017 Trui ........................ G01B 5/004
11,072,066 B2 * 7/2021 Konagai ................ B25J 9/0048
(Continued)

FOREIGN PATENT DOCUMENTS

CN 105619391 A * 6/2016 ............ B25J 9/0048
CN 107932480 A 4/2018
(Continued)

OTHER PUBLICATIONS

Decision to Grant for Japanese Application No. 2022-562569 dated Dec. 20, 2022.
(Continued)

*Primary Examiner* — Bobby Rushing, Jr.
(74) *Attorney, Agent, or Firm* — Sughrue Mion, PLLC (57) ABSTRACT

A parallel link mechanism includes three or more link mechanisms that couple a fixed base and an end-effector base. The end-effector base has a facing surface facing the fixed base. The link mechanisms each include a proximal-end joint, a proximal link, an intermediate joint, a distal link, and a distal-end joint. The proximal-end joint is rotatably coupled to the fixed base. The proximal link is coupled to the proximal-end joint. The intermediate joint is provided to the proximal link. The distal link is rotatably coupled to the proximal link via the intermediate joint. The distal-end joint rotatably couples the distal link to the end-effector base. The point of intersection at which the extensions of the axes of rotation of the proximal-end joints, the extensions of the axes of rotation of the intermediate joints, and the extensions of the axes of rotation of the distal-end joints intersect is the center of rotation of the end-effector base. The center of rotation of the end-effector base is positioned in a first direction with respect to the facing surface.

5 Claims, 7 Drawing Sheets

(56) References Cited

U.S. PATENT DOCUMENTS

| | | | | |
|---|---|---|---|---|
| 2010/0043577 A1* | 2/2010 | Rosheim | ............. | F16M 11/123 |
| | | | | 74/5.4 |
| 2022/0134538 A1* | 5/2022 | Trui | ........................ | B25J 9/045 |
| | | | | 74/490.01 |
| 2022/0166288 A1 | 5/2022 | Nose et al. | | |

FOREIGN PATENT DOCUMENTS

| | | | | |
|---|---|---|---|---|
| CN | 111203856 A | * | 5/2020 | |
| EP | 3816477 A1 | * | 5/2021 | ............ B25J 9/0048 |
| JP | 2021-024061 A | | 2/2021 | |
| WO | 2020/196164 A1 | | 10/2020 | |

OTHER PUBLICATIONS

Information Disclosure Statement for PCT/JP2022/022874 dated Aug. 9, 2022.

* cited by examiner

PARALLEL LINK MECHANISM

CROSS REFERENCE TO RELATED APPLICATIONS

This Application is a National Stage of International Application No. PCT/JP2022/022874 filed Jun. 7, 2022, claiming priority based on Japanese Patent Application No. 2021-153643 filed Sep. 21, 2021.

FIELD

The present invention relates to a parallel link mechanism.

BACKGROUND

Parallel link mechanisms have recently been used for devices, such as medical and industrial equipment. As described in the following patent literature, a parallel link mechanism includes a fixed base, an end-effector base separated from the fixed base, and a plurality of link mechanisms that couple the fixed base and the end-effector base. A tool is mounted on the end-effector base. When power is transmitted to at least one of the link mechanisms, the end-effector base tilts about a certain point, thereby changing the posture of the tool. The distal end of the tool moves on a virtual sphere centered at the certain point. In the following description, changing the posture of the tool may be referred to as posture change. The certain point may be referred to as the center of rotation of the end-effector base.

CITATION LIST

Patent Literature

Patent Literature 1: Japanese Patent Application Laid-open No. 2021-24061

SUMMARY

Technical Problem

In the parallel link mechanism described in the patent literature above, the center of rotation of the end-effector base is located closer to the fixed base and is separated from the end-effector base. In other words, the distance from the center of rotation of the end-effector base to the distal end of the tool (the radius of the virtual sphere) is relatively long. Therefore, the end-effector base tilts significantly, and the distal end of the tool moves significantly. In some uses of the device provided with the parallel link mechanism, it may be desired to change only the posture of the tool with the distal end of the tool fixed. If the parallel link mechanism described in the patent literature above is used in such a case, another device that changes the position of the fixed base is required. This configuration is not preferable because it leads to an increase in size of the device including the parallel link mechanism and complicated control.

In view of the disadvantages described above, an object of the present invention is to provide a parallel link mechanism that can reduce the amount of movement of the distal end of a tool in changing the posture of the tool.

Solution to Problem

To achieve the above object, a parallel link mechanism according to the present invention comprising: a fixed base fixed to a base; an end-effector base disposed away from the fixed base in a first direction and that supports a tool; and at least three or more link mechanisms each coupled to the fixed base at a first end and to the end-effector base at a second end, wherein the end-effector base comprises: a support that supports the tool such that a distal end of the tool points in the first direction; and a facing surface facing a second direction in which the fixed base is disposed when viewed from the end-effector base, the link mechanisms each comprise: a proximal-end joint rotatably coupled to the fixed base; a proximal link coupled to the proximal-end joint at a first end; an intermediate joint provided at a second end of the proximal link; a distal link rotatably coupled to the proximal link at a first end via the intermediate joint; and a distal-end joint that rotatably couples a second end of the distal link to the end-effector base, a point of intersection at which an extension of an axis of rotation of the proximal-end joint, an extension of an axis of rotation of the intermediate joint, and an extension of an axis of rotation of the distal-end joint intersect is the center of rotation of the end-effector base, and the center of rotation of the end-effector base is positioned in the first direction with respect to the facing surface.

With the configuration described above, the distance between the center of rotation of the end-effector base and the distal end of the tool is shortened. Therefore, the amount of movement of the distal end of the tool can be reduced in changing the posture of the tool.

Further, in the parallel link mechanism according to an embodiment, the center of rotation of the end-effector base is located between the facing surface and the distal end of the tool on the center line of the tool.

With the configuration described above, the distance in the horizontal direction between the center of rotation of the end-effector base and the center line of the tool is zero. In other words, the distance between the center of rotation of the end-effector base and the distal end of the tool is further shortened. Therefore, the amount of movement of the distal end of the tool can be further reduced in changing the posture of the tool.

Further, in the parallel link mechanism according to an embodiment, the center of rotation of the end-effector base overlaps the distal end of the tool.

With the configuration described above, the distance in the axial and horizontal directions between the center of rotation of the end-effector base and the distal end of the tool is zero. Therefore, the distal end of the tool does not move when the tool changes the posture.

Further, in the parallel link mechanism according to an embodiment, the proximal-end joints are coaxially disposed.

Further, the parallel link mechanism according to an embodiment, further comprising a motor configured to rotate the proximal link about the axis of rotation of the proximal-end joint.

Advantageous Effects of Invention

The parallel link mechanism according to the present invention can change the posture of a tool while reducing the amount of movement of the distal end of the tool.

DESCRIPTION OF EMBODIMENTS

The present invention is described below in greater detail with reference to the drawings. Aspects to embody the invention (hereinafter referred to as embodiments) described below are not intended to limit the present invention. Components in the embodiments below include components easily conceivable by those skilled in the art and components substantially identical therewith, that is, what are called equivalents. Furthermore, the components in the embodiments below can be appropriately combined.

First Embodiment

Figure 1:
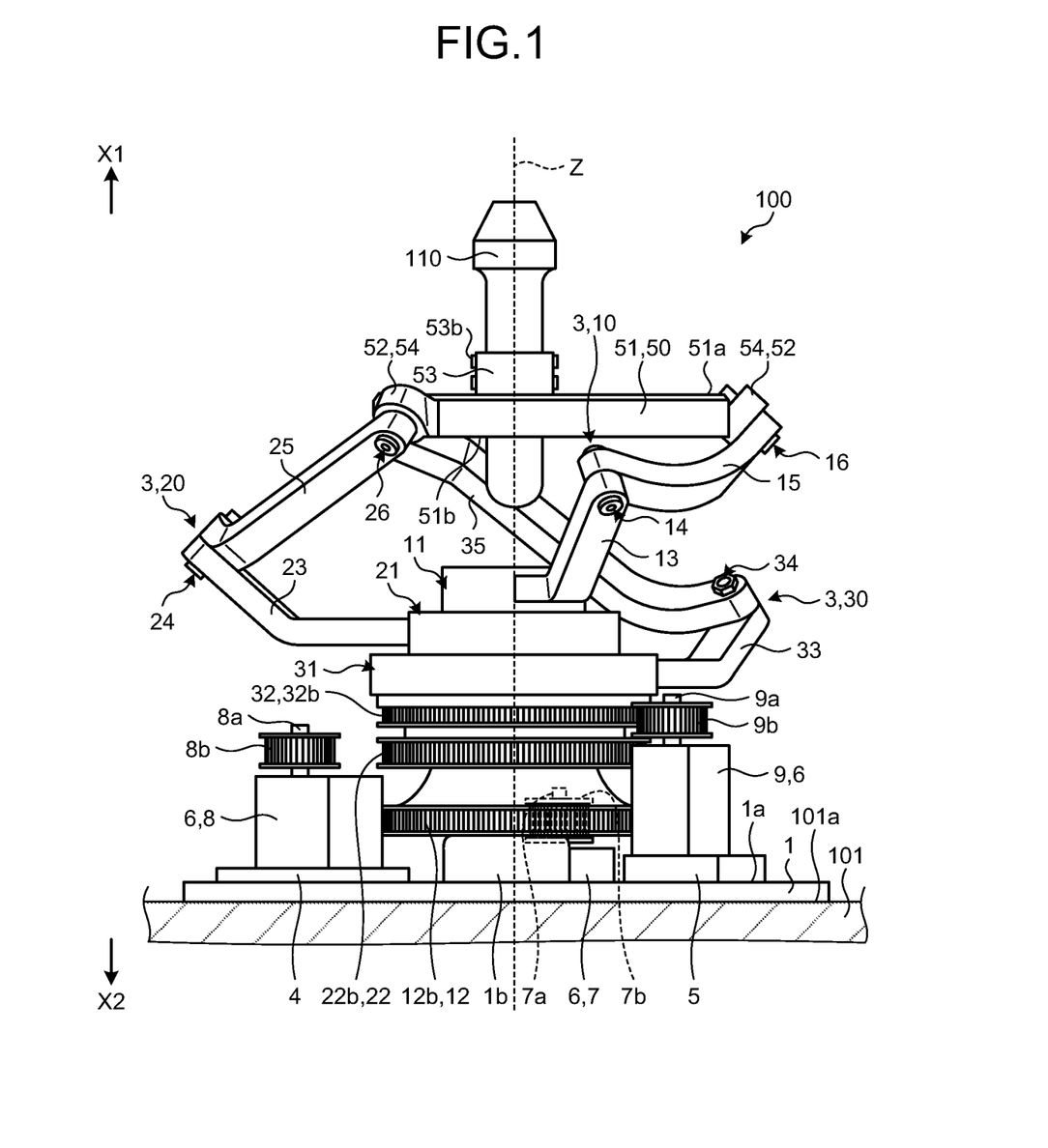
FIG. 1 is a side view of a parallel link mechanism according to a first embodiment viewed from the side.
Figure 2:
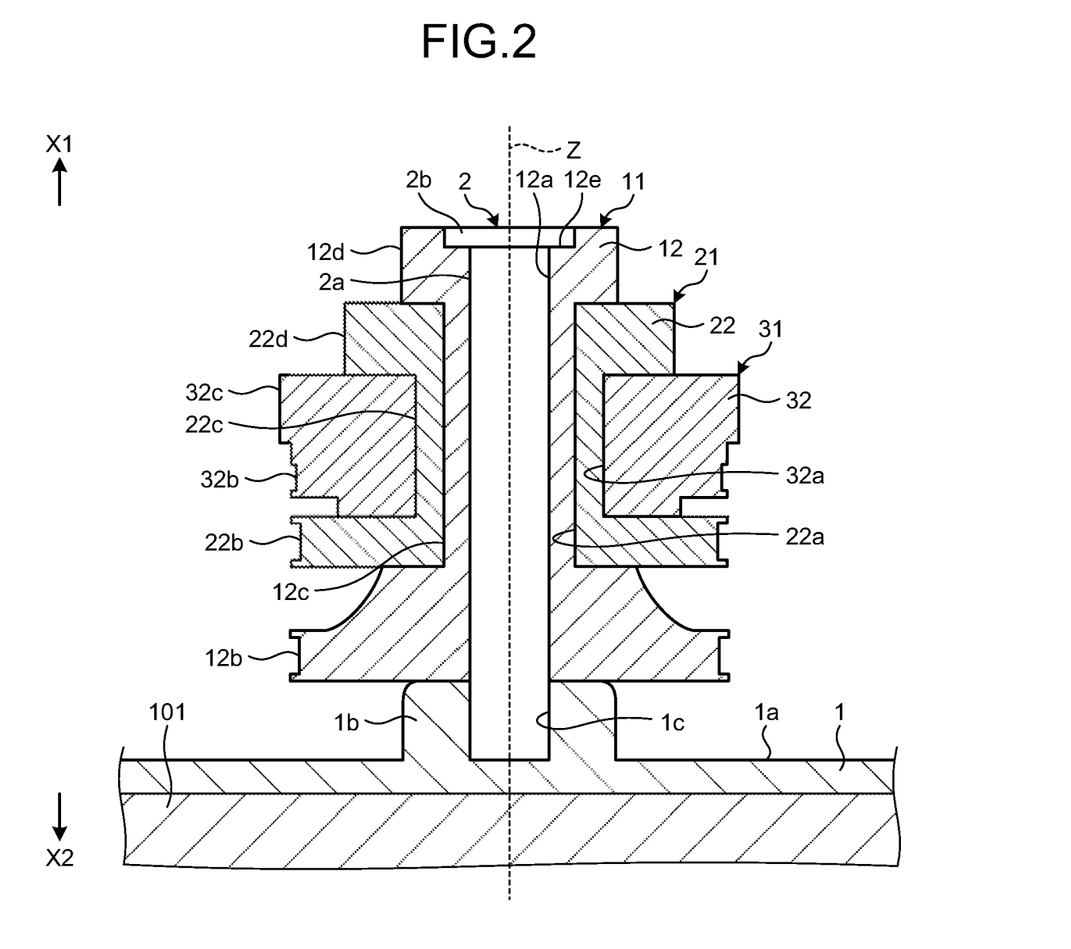
FIG. 2 is a sectional view of proximal-end joints cut in the axial direction.
Figure 3:
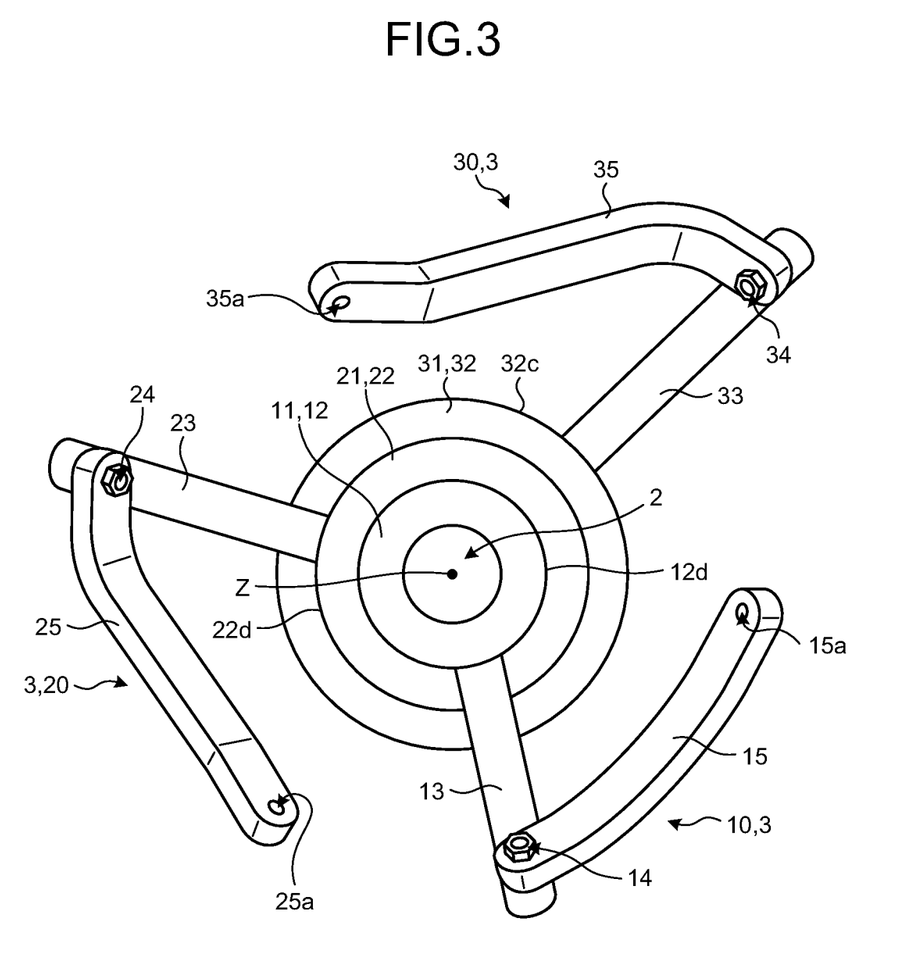
FIG. 3 is a view viewed from an end-effector base in a second direction (toward the proximal-end joints).
Figure 4:
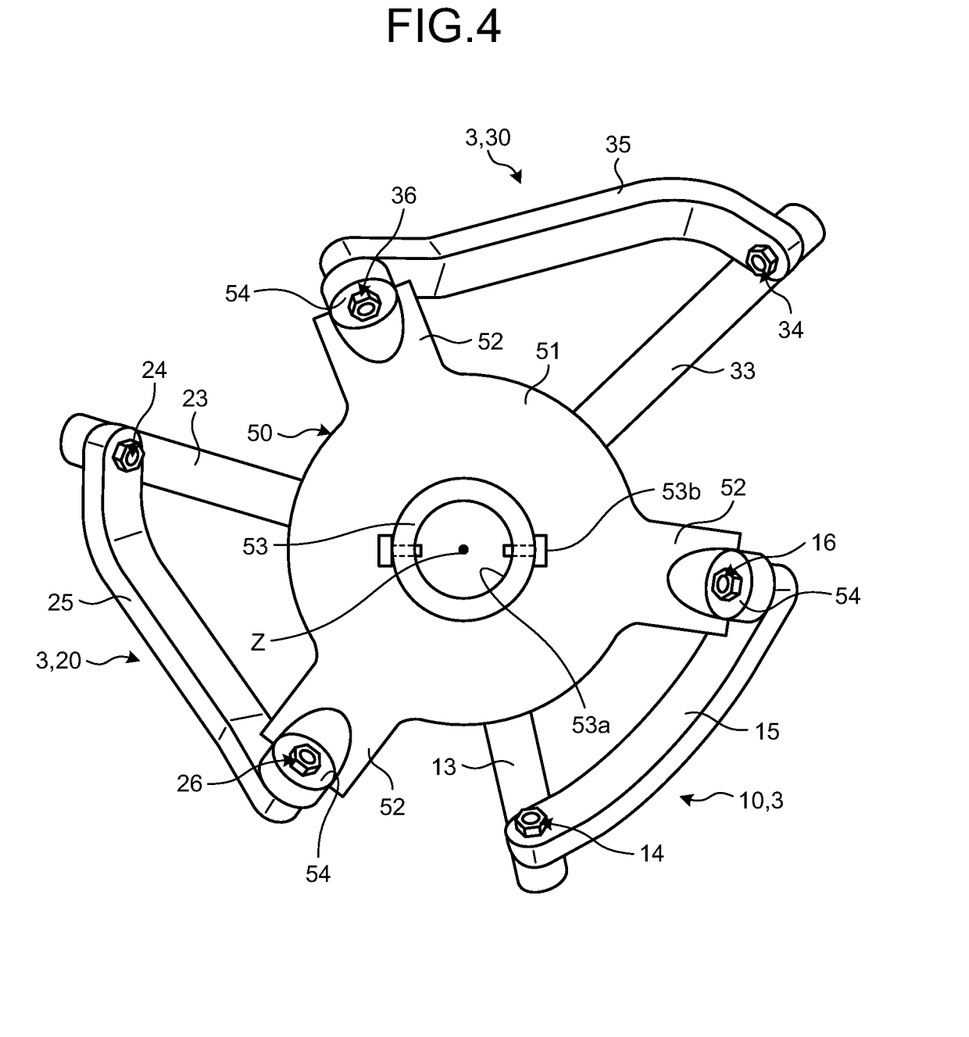
FIG. 4 is a view of the parallel link mechanism (without a tool) viewed from a first direction.
Figure 5:
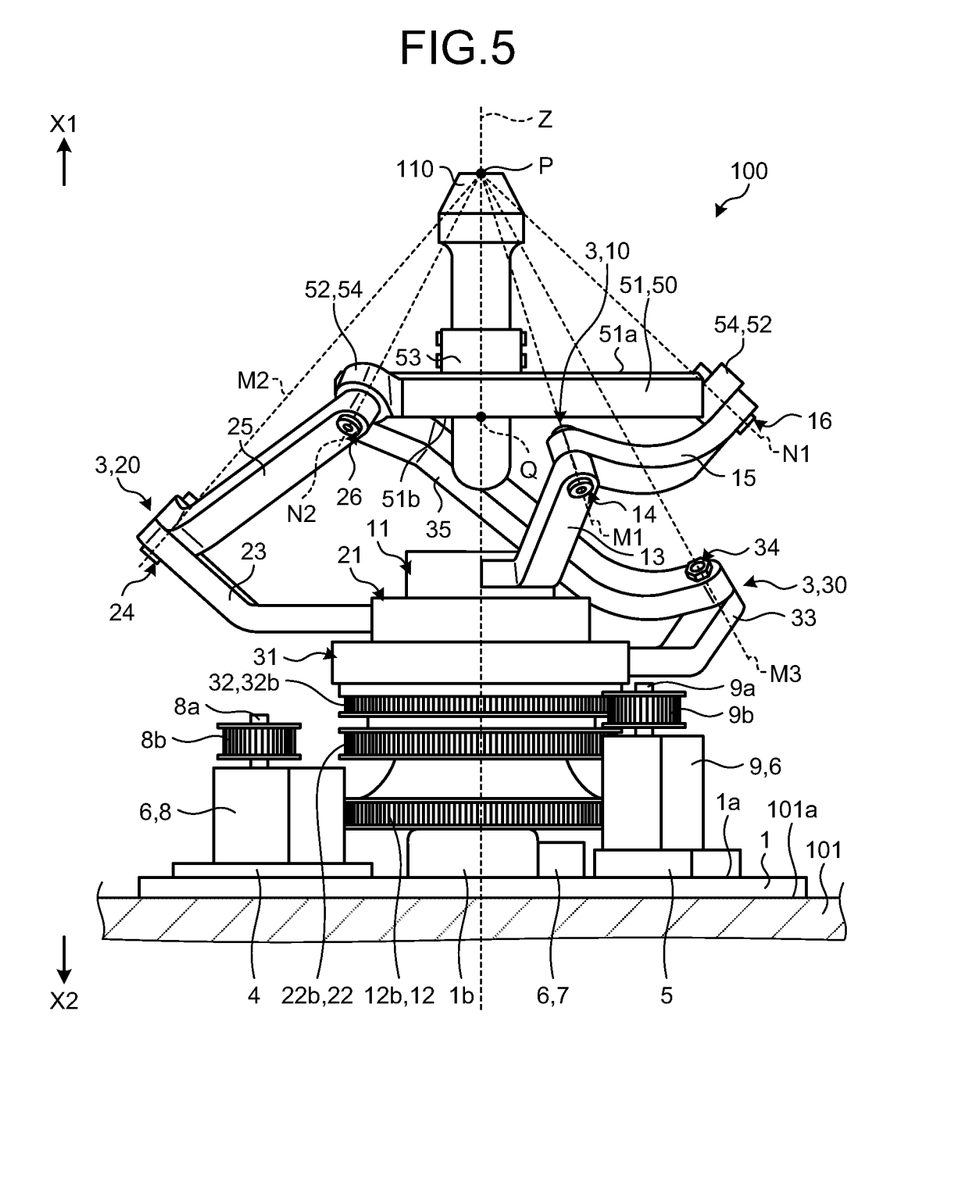
FIG. 5 is a view for explaining directions indicating the extensions of the axes of rotation of respective joints.
Figure 6:
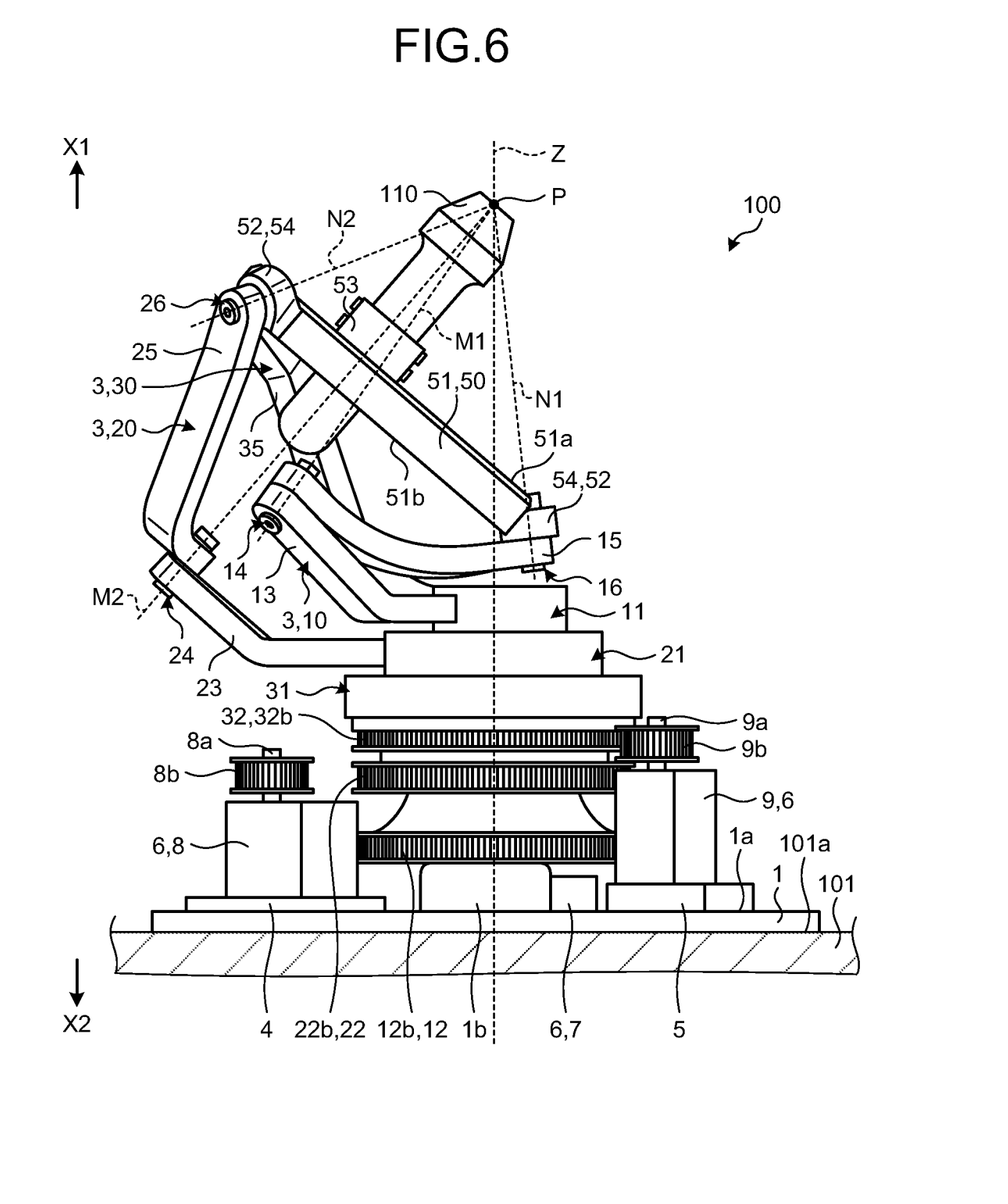
FIG. 6 is a side view of the parallel link mechanism according to the first embodiment in operation.

FIG. 1 is a side view of a parallel link mechanism according to a first embodiment viewed from the side. FIG. 2 is a sectional view of proximal-end joints cut in the axial direction. FIG. 3 is a view viewed from an end-effector base in a second direction (toward the proximal-end joints). FIG. 4 is a view of the parallel link mechanism (without a tool) viewed from a first direction. FIG. 5 is a view for explaining directions indicating the extensions of the axes of rotation of respective joints. FIG. 6 is a side view of the parallel link mechanism according to the first embodiment in operation.

As illustrated in FIG. 1, a parallel link mechanism 100 according to the first embodiment includes a fixed base 1, a plurality of link mechanisms 3, a plurality of motors 6, and an end-effector base 50. The fixed base 1 is fixed to a base 101. Each link mechanism 3 is coupled to the fixed base 1 at a first end. The motors 6 are provided to the fixed base 1. The end-effector base 50 is coupled to a second end of each link mechanism 3.

The fixed base 1 has a plate shape. The fixed base 1 extends along a surface 101a of the base 101. The fixed base 1 is fixed to the base 101 with bolts, which are not illustrated. The fixed base 1 has a first surface 1a facing the end-effector base 50. The first surface 1a is a flat surface. A virtual reference line Z extending in the normal direction with respect to the first surface 1a is set at the center of the fixed base 1. The reference line Z is used as a reference to dispose each part of the parallel link mechanism 100. The center of the first surface 1a of the fixed base 1 is provided with a fixing part 1b. The fixing part 1b has a hole 1c opening toward the end-effector base 50 (refer to FIG. 2).

In the following description, a direction parallel to the reference line Z is referred to as the axial direction. In the axial direction, a direction in which the end-effector base 50 is disposed when viewed from the fixed base 1 is referred to as a first direction X1. In the axial direction, a direction in which the fixed base 1 is disposed when viewed from the end-effector base 50 is referred to as a second direction X2. A direction orthogonal to the reference line Z (parallel to the first surface 1a) is referred to as the horizontal direction. In the horizontal direction, a direction away from the reference line Z is referred to as an outer side in the radial direction.

In the horizontal direction, a direction closer to the reference line Z is referred to as an inner side in the radial direction.

As illustrated in FIG. 1, the motors 6 are fixed to the first surface 1a of the fixed base 1. The same number of (three) motors 6 as the link mechanisms 3 are provided. The three motors 6 are disposed at intervals of 120° about the reference line Z. The first surface 1a of the fixed base 1 is provided with two pedestals 4 and 5. The pedestal 5 protrudes farther in the first direction X1 than the pedestal 4. One of the three motors 6 is disposed on the first surface 1a of the fixed base 1. Another one of the three motors 6 is disposed on the pedestal 4. The remaining one of the three motors 6 is set on the pedestal 5. Therefore, the three motors 6 differ in position in the axial direction. In the following description, the three motors 6 are referred to as a first motor 7, a second motor 8, and a third motor 9 in the order of being disposed closer to the fixed base 1. An output shaft 7a of the first motor 7 extends in the first direction X1. The output shaft 7a is provided with a drive pulley 7b. Similarly, an output shaft 8a of the second motor 8 and an output shaft 9a of the third motor 9 extend in the first direction X1 and are provided with drive pulleys 8b and 9b, respectively.

The number of link mechanisms 3 according to the present embodiment is three. In the following description, the three link mechanisms are referred to as a first link mechanism 10, a second link mechanism 20, and a third link mechanism 30. The link mechanisms 3 (the first link mechanism 10, the second link mechanism 20, and the third link mechanism 30) include the same technology application elements: a proximal-end joint (a first proximal-end joint 11, a second proximal-end joint 21, and a third proximal-end joint 31), a proximal link (a first proximal link 13, a second proximal link 23, and a third proximal link 33), an intermediate joint (a first intermediate joint 14, a second intermediate joint 24, and a third intermediate joint 34), a distal link (a first distal link 15, a second distal link 25, and a third distal link 35), and a distal-end joint (a first distal-end joint 16, a second distal-end joint 26, and a third distal-end joint 36 (which is not illustrated in FIG. 1. Refer to FIG. 4)).

As illustrated in FIG. 2, the proximal-end joints (the first proximal-end joint 11, the second proximal-end joint 21, and the third proximal-end joint 31) include a columnar shaft 2 and cylindrical parts (a first cylindrical part 12, a second cylindrical part 22, and a third cylindrical part 32) rotatably fitted around the shaft 2.

The shaft 2 extends in the axial direction. The end of the shaft 2 in the second direction X2 is fitted into the hole 1c in the fixing part 1b. As a result, the shaft 2 integrates with the fixed base 1, and the center of the shaft 2 overlaps the reference line Z. The end of the shaft 2 in the first direction X1 is provided with a retaining part 2b protruding toward the outer side in the radial direction from an outer circumferential surface 2a of the shaft 2. The retaining part 2b prevents the first cylindrical part 12, the second cylindrical part 22, and the third cylindrical part 32 from coming off the shaft 2.

The first cylindrical part 12 is fitted around the outer circumference of the shaft 2. An inner circumferential surface 12a of the first cylindrical part 12 is in slidable contact with the outer circumferential surface 2a of the shaft 2. The outer circumferential surface of the first cylindrical part 12 has a first driven pulley 12b, a first fitted surface 12c, and a first coupling surface 12d in order from the second direction X2 to the first direction X1. As illustrated in FIG. 1, the first driven pulley 12b is disposed in the horizontal direction with respect to the drive pulley 7b of the first motor 7. An endless belt, which is not illustrated, is suspended between the first driven pulley 12b and the drive pulley 7b. When the first motor 7 is driven, the power is transmitted to the first cylindrical part 12. Thus, the first cylindrical part 12 rotates about the shaft 2 (reference line Z). The first fitted surface 12c and the first coupling surface 12d have a circular shape in cross section. The end surface of the first cylindrical part 12 in the first direction X1 has a recess 12e recessed in the second direction X2. The recess 12e accommodates the retaining part 2b. The inner circumferential surface 12a of the first cylindrical part 12 according to the present embodiment is in slidable contact with the outer circumferential surface 2a of the shaft 2. To rotate the first cylindrical part 12 more smoothly, the present invention may include a bearing interposed between the inner circumferential surface 12a of the first cylindrical part 12 and the outer circumferential surface 2a of the shaft 2.

As illustrated in FIG. 2, the second cylindrical part 22 is fitted around the outer circumference of the first fitted surface 12c of the first cylindrical part 12. An inner circumferential surface 22a of the second cylindrical part 22 is in slidable contact with the first fitted surface 12c. The outer circumferential surface of the second cylindrical part 22 has a second driven pulley 22b, a second fitted surface 22c, and a second coupling surface 22d in order from the second direction X2 to the first direction X1. As illustrated in FIG. 1, the second driven pulley 22b is disposed in the horizontal direction with respect to the drive pulley 8b of the second motor 8. An endless belt, which is not illustrated, is suspended between the second driven pulley 22b and the drive pulley 8b. When the second motor 8 is driven, the power is transmitted to the second cylindrical part 22. Thus, the second cylindrical part 22 rotates about the shaft 2 (reference line Z). The second fitted surface 22c and the second coupling surface 22d have a circular shape in cross section. The inner circumferential surface 22a of the second cylindrical part 22 according to the present embodiment is in slidable contact with the first fitted surface 12c of the first cylindrical part 12. To rotate the second cylindrical part 22 more smoothly, the present invention may include a bearing interposed between the inner circumferential surface 22a of the second cylindrical part 22 and the first fitted surface 12c of the first cylindrical part 12.

As illustrated in FIG. 2, the third cylindrical part 32 is fitted around the outer circumference of the second fitted surface 22c of the second cylindrical part 22. An inner circumferential surface 32a of the third cylindrical part 32 is in slidable contact with the second fitted surface 22c. The outer circumferential surface of the third cylindrical part 32 has a third driven pulley 32b and a third coupling surface 32c in order from the second direction X2 to the first direction X1. As illustrated in FIG. 1, the third driven pulley 32b is disposed in the horizontal direction with respect to the drive pulley 9b of the third motor 9. An endless belt, which is not illustrated, is suspended between the third driven pulley 32b and the drive pulley 9b. When the third motor 9 is driven, the power is transmitted to the third cylindrical part 32. Thus, the third cylindrical part 32 rotates about the shaft 2 (reference line Z). The third coupling surface 32c has a circular shape in cross section. The inner circumferential surface 32a of the third cylindrical part 32 according to the present embodiment is in slidable contact with the second fitted surface 22c of the second cylindrical part 22. To rotate the third cylindrical part 32 more smoothly, the present invention may include a bearing interposed between the inner circumferential surface 32a of the third cylindrical part 32 and the second fitted surface 22c of the second cylindrical part 22.

The endless belt, which is not illustrated, suspended between the drive pulley 7b and the first driven pulley 12b, the endless belt, which is not illustrated, suspended between the drive pulley 8b and the second driven pulley 22b, and the endless belt, which is not illustrated, suspended between the drive pulley 9b and the third driven pulley 32b differ in position in the axial direction. Therefore, the endless belts do not interfere with each other.

As illustrated in FIG. 3, the proximal links (the first proximal link 13, the second proximal link 23, and the third proximal link 33) extend in the radial direction with a first end pointing to the inner side in the radial direction and a second end pointing to the outer side in the radial direction. The first end of the first proximal link 13 is coupled to the first coupling surface 12d of the first cylindrical part 12. The first end of the second proximal link 23 is coupled to the second coupling surface 22d of the second cylindrical part 22. The first end of the third proximal link 33 is coupled to the third coupling surface 32c of the third cylindrical part 32. The first proximal link 13, the second proximal link 23, and the third proximal link 33 are disposed at intervals of 120° about the shaft 2 when the parallel link mechanism 100 starts to be operated.

A first end of the distal link (the first distal link 15, the second distal link 25, and the third distal link 35) is coupled to the second end of the proximal link (the first proximal link 13, the second proximal link 23, and the third proximal link 33) via the intermediate joint (the first intermediate joint 14, the second intermediate joint 24, and the third intermediate joint 34). The first distal link 15, the second distal link 25, and the third distal link 35 are disposed to extend in the circumferential direction about the shaft 2 when the parallel link mechanism 100 starts to be operated.

The intermediate joints (the first intermediate joint 14, the second intermediate joint 24, and the third intermediate joint 34) and the distal-end joints (the first distal-end joint 16, the second distal-end joint 26, and the third distal-end joint 36) rotatably couple the parts. The intermediate joints and the distal-end joints according to the present embodiment are composed of bolts and nuts. Therefore, the axis of rotation (refer to the extensions of the axes of rotation M1, M2, M3, N1, and N2 illustrated in FIG. 5) corresponds to the center of the shaft of the bolt.

Second ends of the distal links (the first distal link 15, the second distal link 25, and the third distal link 35) have through holes 15a, 25a, and 35a, respectively, through which the shaft of the bolt passes. Similarly, the second ends of the proximal links (the first proximal link 13, the second proximal link 23, and the third proximal link 33) and the first ends of the distal links (the first distal link 15, the second distal link 25, and the third distal link 35) have through holes, which are not illustrated.

The length in the radial direction of the proximal links is shorter in the order of the first proximal link 13, the second proximal link 23, and the third proximal link 33. Similarly, the length of the distal links is shorter in the order of the first distal link 15, the second distal link 25, and the third distal link 35. With this configuration, the first link mechanism 10 moves on the inner circumference side of the second link mechanism 20 and the third link mechanism 30 when the parallel link mechanism 100 is operated. The second link mechanism 20 moves on the outer circumference side of the first link mechanism 10 and on the inner circumference side of the third link mechanism 30. The third link mechanism 30 moves on the outer circumference side of the first link mechanism 10 and the second link mechanism 20. In other words, the three link mechanisms 3 are not in contact with each other. In addition, the proximal links (the first proximal link 13, the second proximal link 23, and the third proximal link 33) and the distal links (the first distal link 15, the second distal link 25, and the third distal link 35) appropriately bent to avoid contact with the cylindrical parts (12, 22, and 32) and a tool 110.

As illustrated in FIG. 4, the end-effector base 50 includes a body 51, protrusions 52, and a support 53. The body 51 has a circular plate shape. The protrusions 52 protrude toward the outer side in the radial direction from the outer circumference of the body 51. The support 53 is provided at the center of the body 51.

As illustrated in FIG. 1, the body 51 extends in the horizontal direction when the parallel link mechanism 100 starts to be operated. The surface of the body 51 in the first direction X1 is a first surface 51a facing the direction in which the distal end of the tool 110 faces. The surface of the body 51 in the second direction X2 is a facing surface 51b facing the fixed base 1.

As illustrated in FIG. 4, pedestals 54 are provided at the ends of the respective protrusions 52 on the outer side in the radial direction. Each pedestal 54 is coupled to the second end of the distal link (the first distal link 15, the second distal link 25, and the third distal link 35) via the distal-end joint (the first distal-end joint 16, the second distal-end joint 26, and the third distal-end joint 36). The pedestal 54 inclines such that the extension of the axis of rotation of the distal-end joint (the first distal-end joint 16, the second distal-end joint 26, and the third distal-end joint 36) (refer to N1 and N2 illustrated in FIG. 5) faces the end of the tool 110 in the first direction X1 (a distal end P of the tool 110).

The support 53 has a cylindrical shape and has a holding hole 53a passing therethrough in the axial direction. The support 53 is provided on the first surface 51a of the body 51. The holding hole 53a passes through the body 51. The tool 110 is inserted and fitted into the holding hole 53a. As illustrated in FIG. 1, the tool 110 passes through the end-effector base 50. In other words, the tool 110 protrudes from the facing surface 51b in the second direction X2. The support 53 is provided with bolts 53b passing through the support 53 in the radial direction. The bolts 53b are screwed into the support 53. Rotating the bolt 53b changes the amount of protrusion into the holding hole 53a. The bolts 53b hold the tool 110 so as to prevent it from coming off the holding hole 53a.

The tool 110 has such a shape that the end in the first direction X1 protrudes toward the outer side in the radial direction. The end surface of the tool 110 in the first direction X1 is a circular flat surface. The center of the end surface of the tool 110 in the first direction X1 is on the reference line Z. In the following description, the center of the end surface of the tool 110 in the first direction X1 is referred to as the distal end P.

The following describes the parallel link mechanism 100 in detail. When at least one or more of the motors 6 are driven, the parallel link mechanism 100 tilts the end-effector base 50 and changes the posture of the tool 110 (refer to FIG. 6). When the parallel link mechanism 100 is operated, the end-effector base 50 and the tool 110 tilt about a certain point. The certain point is the point of intersection at which the extensions of the axes of rotation of the joints intersect. The following describes the point of intersection (certain point) at which the extensions of the axes of rotation of the joints intersect according to the present embodiment.

As illustrated in FIG. 5, the axes of rotation of the first proximal-end joint 11, the second proximal-end joint 21, and the third proximal-end joint 31 overlap the reference line Z.

Therefore, the extensions of the axes of rotation of the first proximal-end joint 11, the second proximal-end joint 21, and the third proximal-end joint 31 pass through the distal end P of the tool 110. The extension M1 of the axis of rotation of the first intermediate joint 14, the extension M2 of the axis of rotation of the second intermediate joint 24, and the extension M3 of the axis of rotation of the third intermediate joint 34 intersect at the distal end P of the tool 110. The extension N1 of the axis of rotation of the first distal-end joint 16, the extension N2 of the axis of rotation of the second distal-end joint 26, and the extension of the axis of rotation of the third distal-end joint 36 (which is not illustrated in the first embodiment. Refer to an extension N3 in FIG. 7 according to a second embodiment) intersect at the distal end P of the tool 110. As described above, the extensions of the axes of rotation of the proximal-end joints, the extensions of the axes of rotation of the intermediate joints, and the extensions of the axes of rotation of the distal-end joints intersect at the distal end P of the tool 110. Thus, the certain point according to the present embodiment is at the distal end P of the tool 110. When the parallel link mechanism 100 according to the first embodiment is operated, the tool 110 changes the posture about the distal end P as illustrated in FIG. 6. Therefore, the position of the distal end P of the tool 110 is not displaced.

As described above, the parallel link mechanism 100 according to the first embodiment includes the fixed base 1, the end-effector base 50, and at least three or more link mechanisms 3. The fixed base 1 is fixed to the base 101. The end-effector base 50 is disposed away from the fixed base 1 in the first direction X1 and supports the tool 110. The link mechanisms 3 are each coupled to the fixed base 1 at a first end and to the end-effector base 50 at a second end. The end-effector base 50 includes the support 53 and the facing surface 51b. The support 53 supports the tool 110 such that the distal end of the tool 110 points in the first direction X1. The facing surface 51b faces the second direction X2 in which the fixed base 1 is disposed when viewed from the end-effector base 50. The link mechanisms 3 each include the proximal-end joint (11, 21, and 31), the proximal link (13, 23, and 33), the intermediate joint (14, 24, and 34), the distal link (15, 25, and 35), and the distal-end joint (16, 26, and 36). The proximal-end joint (11, 21, and 31) is rotatably coupled to the fixed base 1. The proximal link (13, 23, and 33) is coupled to the proximal-end joint (11, 21, and 31) at a first end. The intermediate joint (14, 24, and 34) is provided at a second end of the proximal link (13, 23, and 33). The distal link (15, 25, and 35) is rotatably coupled to the proximal link (13, 23, and 33) at a first end via the intermediate joint (14, 24, and 34). The distal-end joint (16, 26, and 36) rotatably couples a second end of the distal link (15, 25, and 35) to the end-effector base 50. The point of intersection at which the extensions of the axes of rotation of the proximal-end joints (11, 21, and 31), the extensions (M1, M2, and M3) of the axes of rotation of the intermediate joints (14, 24, and 34), and the extensions (N1 and N2) of the axes of rotation of the distal-end joints intersect is the center of rotation of the end-effector base 50. The center of rotation of the end-effector base 50 is positioned in the first direction X1 with respect to the facing surface 51b and overlaps the distal end P of the tool 110. The proximal-end joints (11, 21, and 31) are coaxially disposed. The parallel link mechanism 100 includes the motors 6 that rotate the proximal links (13, 23, and 33) about the axis of rotation of the proximal-end joints (11, 21, and 31).

In the parallel link mechanism 100 according to the first embodiment described above, the distal end P of the tool 110 does not move when the tool 110 changes the posture.

While the first embodiment has been described above, the parallel link mechanism according to the present invention is not limited to that described in the first embodiment. For example, the position of the center of rotation of the end-effector base 50 is not limited to the example according to the first embodiment. The following describes a modification obtained by changing the position of the center of rotation of the end-effector base 50.

The center of rotation of the end-effector base 50 according to the present invention may be slightly deviated in the first direction X1 or the horizontal direction with respect to the distal end P of the tool 110. This modification can also reduce the amount of movement of the distal end P of the tool 110.

Alternatively, the center of rotation of the end-effector base 50 may be located between the facing surface 51b and the distal end P of the tool 110 on the center line of the tool 110. Specifically, as illustrated in FIG. 5, the reference line Z passing through the center line of the tool 110 passes through a point Q on the facing surface 51b of the end-effector base 50. The center of rotation of the end-effector base 50 may be located on the reference line Z and between the point Q and the distal end P. According to the modification, the center of rotation of the end-effector base 50 overlaps the distal end P of the tool 110 when viewed from the axial direction. In other words, the distance between the center of rotation of the end-effector base 50 and the center line of the tool 110 is zero. Therefore, the amount of movement of the distal end P of the tool 110 can be reduced.

As described above, the center of rotation of the end-effector base 50 according to the present invention simply needs to be located in the first direction X1 with respect to the facing surface 51b of the end-effector base 50. With this configuration, the distance from the center of rotation of the end-effector base 50 to the distal end P of the tool 110 is relatively short, and the amount of movement of the distal end P of the tool 110 can be reduced.

While the first embodiment has been described above, the parallel link mechanism according to the present invention is not limited to the example described in the first embodiment. While the three motors 6 according to the first embodiment, for example, are disposed at equal intervals (intervals of 120°) about the reference line Z, they may be differently disposed in the parallel link mechanism according to the present invention. In other words, the following parallel link mechanisms are included in the parallel link mechanism according to the present invention: a parallel link mechanism in which the three motors 6 are disposed in the circumferential direction about the reference line Z, but their intervals are not equal, and a parallel link mechanism in which the three motors 6 are collectively disposed in the same direction when viewed from the reference line Z.

Second Embodiment

The following describes a parallel link mechanism 100A according to a second embodiment. Components technically the same as those described in the first embodiment are denoted by like reference numerals, and detailed explanation thereof is omitted.

Figure 7:
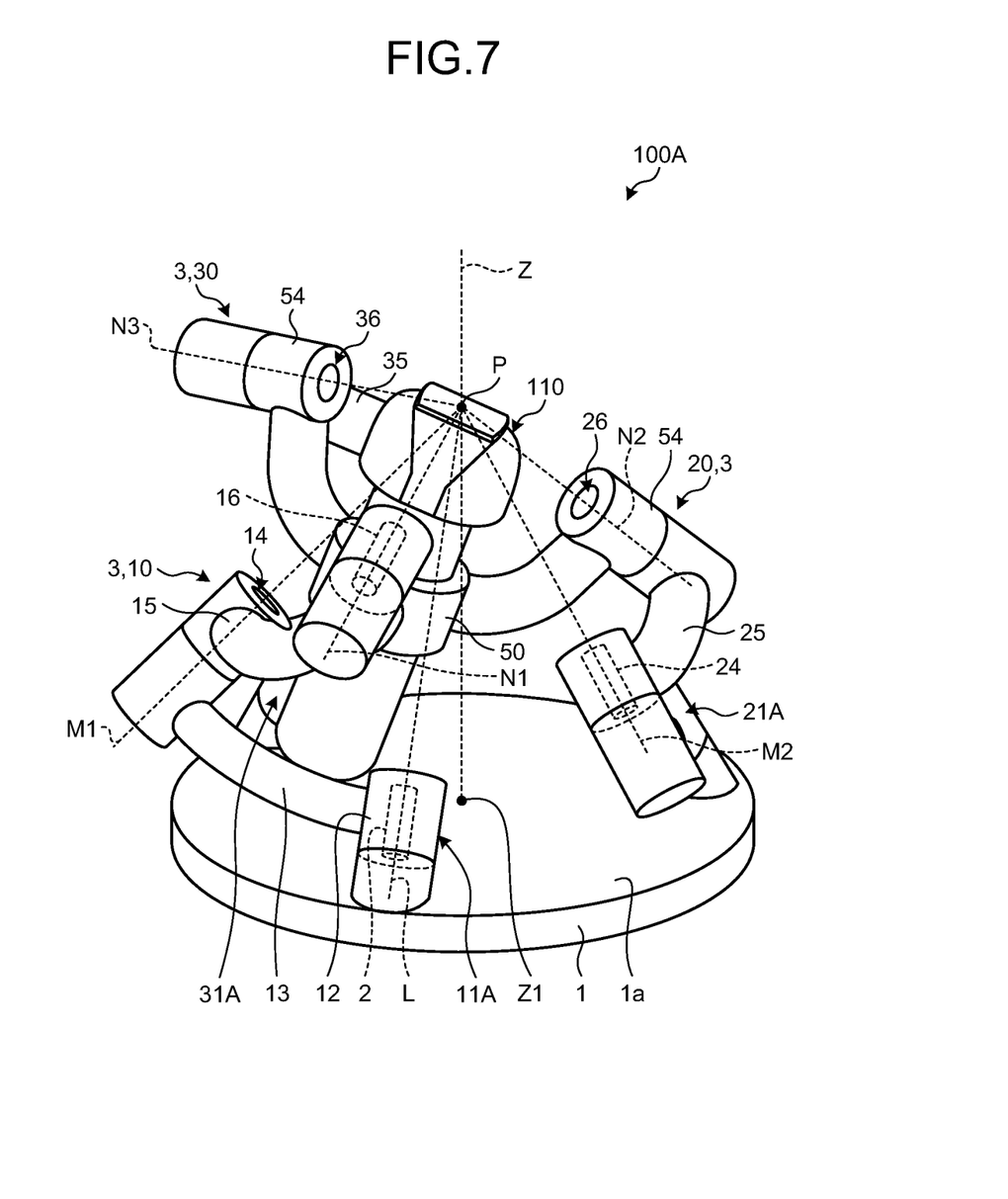
FIG. 7 is a side view of the parallel link mechanism according to a second embodiment in operation viewed from the side.

FIG. 7 is a side view of the parallel link mechanism according to the second embodiment in operation viewed from the side. The parallel link mechanism 100A according to the second embodiment is different from the parallel link mechanism 100 according to the first embodiment in that it does not include the motors 6. The parallel link mechanism 100A according to the second embodiment is different from the parallel link mechanism 100 according to the first embodiment in that the proximal-end joints (11A, 21A, and 31A) are not coaxially disposed. The following describes only the differences.

Motors according to the second embodiment are provided to a device (or a base), which is not illustrated, to which the parallel link mechanism 100A is fixed. The three link mechanisms 3 (10, 20, and 30) are operated by power transmitted from the motors in the device (or the base), which is not illustrated. As described above, the parallel link mechanism according to the present invention does not necessarily include the motors. There are no particular restrictions on the positions of the three motors provided to the device, which is not illustrated, to which the parallel link mechanism 100A is fixed.

The proximal-end joints (11A, 21A, and 31A) are dispersedly disposed on a first surface a of the fixed base 1. The extensions of the rotational axes of the proximal-end joints (11A, 21A, and 31A) (only an extension L of the axis of rotation of the first proximal-end joint 11A is illustrated in FIG. 7) intersect at the distal end P of the tool 110.

As described above, the parallel link mechanism 100A according to the second embodiment also tilts the end-effector base 50 about the distal end P of the tool 110. Therefore, the position of the distal end P of the tool 110 is not displaced.

While the first and the second embodiments have been described above, the number of link mechanisms 3 according to the present invention is not limited to three. The number of link mechanisms 3 simply needs to be at least three or more and may be four.

REFERENCE SIGNS LIST 1 fixed base
2 shaft
3 link mechanism
6 motor
10 first link mechanism
11, 11A first proximal-end joint
12 first cylindrical part
13 first proximal link
14 first intermediate joint
15 first distal link
16 first distal-end joint
20 second link mechanism
21, 21A second proximal-end joint
22 second cylindrical part
23 second proximal link
24 second intermediate joint
25 second distal link
26 second distal-end joint
30 third link mechanism
31, 31A third proximal-end joint
32 third cylindrical part
33 third proximal link
34 third intermediate joint
35 third distal link
36 third distal-end joint
50 end-effector base
51b facing surface
53 support
100, 100A parallel link mechanism
101 base L, M1, M2, M3, N1, N2 extension
P distal end
Q point
Z reference line

The invention claimed is:

1. A parallel link mechanism comprising:
a fixed base fixed to a base;
an end-effector base disposed away from the fixed base in a first direction and that supports a tool; and
at least three or more link mechanisms each coupled to the fixed base at a first end and to the end-effector base at a second end, wherein
the end-effector base comprises:
   a support that supports the tool such that a distal end of the tool points in the first direction;
   a facing surface facing a second direction in which the fixed base is disposed when viewed from the end-effector base; and
   a first surface opposite to the facing surface and facing the first direction,
the link mechanisms each comprise:
   a proximal-end joint rotatably coupled to the fixed base;
   a proximal link coupled to the proximal-end joint at a first end;
   an intermediate joint provided at a second end of the proximal link;
   a distal link rotatably coupled to the proximal link at a first end via the intermediate joint; and
   a distal-end joint that rotatably couples a second end of the distal link to the end-effector base,
a point of intersection at which an extension of an axis of rotation of the proximal-end joint, an extension of an axis of rotation of the intermediate joint, and
an extension of an axis of rotation of the distal-end joint intersect is at a center of rotation of the end-effector base, and
the center of rotation of the end-effector base is positioned in the first direction with respect to the first surface on a center line of the tool.

2. The parallel link mechanism according to claim 1, wherein the center of rotation of the end-effector base overlaps the distal end of the tool.

3. The parallel link mechanism according to claim 1, further comprising a motor configured to rotate the proximal link about the axis of rotation of the proximal-end joint.

4. The parallel link mechanism according to claim 1, wherein the proximal-end joints are coaxially disposed.

5. The parallel link mechanism according to claim 4, further comprising a motor configured to rotate the proximal link about the axis of rotation of the proximal-end joint.

* * * * *